United States Patent [19]

Yamada et al.

[11] 4,427,482

[45] Jan. 24, 1984

[54] METHOD FOR PRODUCING PREPREG ROVINGS

[75] Inventors: Fumiyoshi Yamada, Kishiwada; Shunichi Hiraishi, Sakai, both of Japan

[73] Assignee: Dainippon Ink & Chemicals, Inc., Tokyo, Japan

[21] Appl. No.: 236,178

[22] Filed: Feb. 20, 1981

Related U.S. Application Data

[63] Continuation of Ser. No. 87,455, Oct. 22, 1979, abandoned.

[30] Foreign Application Priority Data

Oct. 24, 1978 [JP] Japan .................................. 53-129974
Jul. 9, 1979 [JP] Japan .................................. 54-85863

[51] Int. Cl.³ .................................................. C09J 5/02
[52] U.S. Cl. .................................. 156/307.3; 156/179; 156/180; 156/245; 156/313; 156/331.4; 156/332; 264/137; 427/389.7; 427/434.6; 428/114; 428/247; 428/296; 525/126; 525/328; 525/440; 528/83
[58] Field of Search ............ 156/179, 313, 180, 331.4, 156/245, 332, 307.3; 428/114, 396, 247; 427/389.7, 434.6; 525/126, 440, 328; 264/137; 528/83

[56] References Cited

U.S. PATENT DOCUMENTS

| | | | |
|---|---|---|---|
| 2,596,162 | 5/1952 | Muskat | 264/137 |
| 2,861,910 | 11/1958 | Johnston et al. | 156/332 |
| 2,977,630 | 4/1961 | Bazler | 156/180 |
| 3,008,917 | 11/1961 | Park et al. | 525/440 |
| 3,222,237 | 12/1965 | McKelvy | 156/179 |
| 3,361,845 | 1/1968 | Watanabe et al. | 264/137 |
| 3,442,739 | 5/1969 | Johnson | 156/180 |

*Primary Examiner*—John J. Gallagher
*Attorney, Agent, or Firm*—Sherman & Shalloway

[57] ABSTRACT

A method for producing a prepreg roving, which comprises impregnating a composition comprising an unsaturated polyester, an unsaturated monomer and a polyisocynate compound in a filamentary reinforcing material, and then heating the impregnated reinforcing material to react the unsaturated polyester with the polyisocyanate compound; and a method for producing a fiber-reinforced plastic article, which comprises disposing prepreg rovings (A), said prepreg rovings being prepared by the above method between at least two plies of sheet molding compound (B) obtained by impregnating a composition comprising an unsaturated polyester and an unsaturated monomer in glass fibers and forming the impregnated product into a sheet; and consolidating the resulting assembly under heat and pressure.

9 Claims, 7 Drawing Figures

METHOD FOR PRODUCING PREPREG ROVINGS

This is a continuation, of Application Ser. No. 87,455, filed Oct. 22, 1979, now abandoned.

This invention relates to a method for producing novel and useful prepreg rovings.

Fiber-reinforced plastics (to be abbreviated "FRP") obtained by impregnating an unsaturated polyester resin in a reinforcing material such as glass fibers, molding the product into the desired shape and curing the molded product find extensive use in tanks, fishing boats, pipes, bath tubs, containers, etc. because of their excellent corrosion resistance, light weight and high strength.

A general molding method for FRP is roughly classified into two types, one type comprising molding and curing a resin while it is being impregnated in a reinforcing material; and the other type comprising impregnating a resin in a reinforcing material, subjecting the product to a treatment for bringing the resin to a B-stage to form a molding material having reduced stickiness (i.e., a prepreg), molding the prepreg into the desired shape, and curing the molding product.

Hand layup molding, resin injection molding, and matched die molding belong to the former type, and sheet molding compound (SMC) molding, bulk molding compound (BMC) molding, and prepreg molding fall into the latter type. The latter type method has the advantage that since the molding material is in the B-stage, the amount of monomer that dissipates is smaller than that in the former method, and the working environment can be improved.

When an external force is exerted on FRP, the reinforcing material bears the external force and the unsaturated polyester resin as a materix plays a role of propagating this external force to the reinforcing material. For this reason, the reinforcing material is desirably continuous in view of the properties of FRP, and continuous filaments are frequently used as a reinforcing material for FRP which requires high strength. Plastics reinforced with continuous filaments are molded, for example, by a filament winding (FW) molding method. This method inevitably results in a high filament content, and it is extremely difficult to control the ratio of the resin to the filaments.

The "prepreg," as stated hereinabove, denotes a molding material of reduced stickiness obtained by impregnating a resin in a reinforcing material such as glass fibers and subjecting the product to a certain treatment for bringing the resin to a B-stage. Two methods have already been known for producing the prepreg. One comprises forming a metal linkage between the carboxyl groups of the unsaturated polyester resin and an alkaline earth metal oxide such as MgO or CaO or a metal hydrate to thicken the resin and thus remove its tackiness. The other comprises dissolving a resin, monomer, etc. in a solvent, impregnating the solution in a reinforcing material, and then volatilizing the solvent to remove the tackiness of the resin.

In the early stage of our investigations, we tried to produce prepreg rovings by these two known methods, but could obtain no satisfactory result. The former method requires a long period of time for thickening, and the surface of the resulting prepreg roving is still sticky. Even when the prepreg roving is subjected to a temporary treatment for removing tackiness such as the adhesion of a powder, it gradually becomes sticky as time elapses. Accordingly, when the roving is wound up on a bobbin, it adheres to itself, and is extremely difficult to unwind. Moreover, the unwinding tension becomes non-uniform. It suffers from the additional disadvantage that because the roving lacks elasticity, when it is wound up on a bobbin, the roving is collapsed and its cross-sectional shape is flattened. According to the latter method, the manufacturing time can be shortened, but there is the same tendency as in the former method with regard to deformation such as flattening, and stickiness. Rather, it has been found that the inconvenience owing to stickiness is greater than in the former method, and in several days after windup, unwinding of the roving fails. Moreover, according to the latter method, the amount of monomer is naturally small. Hence, the density of crosslinking is reduced, and the properties of the resulting FRP are deteriorated.

It is an object of this invention to provide a novel prepreg roving which is free from these defects of the prior art.

Another object of this invention is to provide a fiber-reinforced plastic article obtained by consolidating such a prepreg roving and SMC under heat and presure.

We have found that the prepreg roving which meets these objects of this invention can be obtained by impregnating a composition comprising an unsaturated polyester, an unsaturated monomer and a polyisocyanate compound in a filamentary reinforcing material, and then heating the reinforcing material to react the unsaturated polyester with the polyisocyanate compound.

The unsaturated polyester used in this invention is obtained by polycondensing a dibasic acid with a polyhydric alcohol. It can be easily impregnated into the filamentary reinforcing material, and loses stickiness within a short period of time upon reaction with a polyisocyanate compound. Desirably, the unsaturated polyester has a low acid value and a high hydroxyl value, and has a hydroxyl value/acid value ratio of at least 1.5, preferably at least 2.5, and a hydroxyl value of at least 20, preferably at least 30.

When the ratio of the hydroxyl value to the acid value is less than 1.5, a roving having sufficient strength cannot be obtained even if the unsaturated polyester has a hydroxyl value of at least 20. When the hydroxyl value is less than 20, a roving sufficiently free from tackiness can niether be obtained even if the hydroxyl value/acid value ratio is at least 1.5.

The dibasic acid for the production of the unsaturated polyester used in this invention may be any of known alpha, beta-unsaturated dibasic acids such as maleic acid, maleic anhydride, fumaric acid, itaconic acid, citraconic acid, mesaconic acid and chlorinated maleic acid. If desired, it may be used in combination with a saturated dibasic acid such as phthalic anhydride, isophthalic acid, terephthalic acid, monochlorophthalic acid, dichlorophthalic acid, trichlorophthalic acid, Het acid, tetrachlorophthalic anhydride, tetrabromophthalic anhydride, endomethylenetetrahydrophthalic anhydride, adipic acid, sebacic acid, succinic acid, glutaric acid and pimelic acid.

The polyhydric alcohol for the production of the unsaturated polyester used in this invention is preferably any of dihydric alcohols such as ethylene glycol, propylene glycol, diethylene glycol, dipropylene glycol, triethylene glycol, 1,3-butylene glycol, 2,3-butylene glycol, 2,3-butylene glycol, 1,4-butylene glycol, neopentyl glycol, hexylene glycol, octylene glycol, bisphenol A, hydrogenated bisphenol A, bisphenol A/dioxyethyl ether adduct, and bisphenol A/dioxypropyl ether adduct. Alkylene oxides such as ethylene oxide, propylene oxide and butylene oxide can be equally used as dihydric alcohols. As required, a trihydric or higher alcohol such as trimethylolpropane and glycerol may be used together.

A vinyl ester resin derived from a polyepoxy compound and an unsaturated carboxylic acid can also be used as the unsaturated polyester in this invention. Examples of suitable polyepoxy compounds are those obtained by reacting at least 2 moles of epichlorohydrin or a glycerol dihalohydrin with 1 mole of a polyhydric alcohol or polyhydric phenol. Examples of the unsaturated carboxylic acid are acrylic acid, methacrylic acid and crotonic acid. Such a vinyl ester resin is described in U.S. Pat. No. 3,466,259.

The unsaturated monomer used in this invention is liquid at ordinary temperature, and contains an unsaturated double bond in the molecule. Examples of such an unsaturated monomer are styrene, alphamethylstyrene, vinyltoluene, chlorostyrene, (meth)acrylic acid and alkyl esters thereof, acrylonitrile, vinyl acetate, allyl acetate, triallyl cyanurate, triallyl isocyanurate and acrylamide. Styrene and methyl methacrylate are preferred. A normally solid unsaturated monomer such as diacetone acrylamide can be used as a solution in the above unsaturated monomer which is liquid at ordinary temperature.

The polyisocyanate compound used in this invention is usually a diisocyanate compound of the general formula

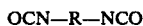

OCN—R—NCO wherein R represents an aliphatic, aromatic or alicyclic divalent group having not more than 20 carbon atoms. Other useful polyisocyanate compounds include isocyanate-terminated isocyanate prepolymers obtained by reacting a polyol such as a diol, triol or tetraol with a diisocyanate so that 2 moles of the isocyanate groups are used per mole of the hydroxyl groups. Preferred diisocyanates are those of the above formula in which R is an alkylene group having not more than 20 carbon atoms, optimally 6 to 16 carbon atoms, a phenylene group, an alkyl-substituted phenylene group, a xylylene group, a diphenylene group, a diphenylene group with the phenylene groups being bonded to each other by an oxygen or sulfur atom or an alkylene group, a naphthylene group, or a cyclohexylene group.

Specific examples of the diisocyanate include aliphatic diisocyanates such as trimethylene diisocyanate, tetramethylene diisocyanate, pentamethylene diisocyanate, heptamethylene diisocyanate, octamethylene diisocyanate, nonamethylene diisocyanate, decamethylene diisocyanate, 1,2-propanediisocyanate, 1,2-butanediisocyanate, 1,2-pentanediisocyanate, 1,3-pentanediisocyanate, 1,4-hexanediisocyanate, 1,5-hexanediisocyanate and 2,2'-diisocyanate diethyl ether; aromatic diisocyanates such as 2-benzylpropanediisocyanate-1,3, 2,4-diphenyl hexanediisocyanate-1,6, p-phenylene diisocyanate, m-phenylene diisocyanate, 4,4'-diphenyl diisocyanate, 1,4-naphthylene diisocyanate, 1,5-naphthylene diisocyanate, 2,6-naphthylene diisocyanate, 2,4-tolylene diisocyanate, 2,6-tolylene diisocyanate, xylylene diisocyanate-1,3, xylylene diisocyanate-1,4, 4,4'-diisocyanate diphenyl ether, and 4,4'-diisocyanate diphenylmethane; and alicyclic diisocyanates such as 1,4-cyclohexane diisocyanate and 1,3-cyclohexane diisocyanate.

Examples of the aforesaid isocyanate prepolymers are those obtained from glycols such as ethylene glycol, propylene glycol, butylene glycol, hexamethylene glycol or diethylene glycol or trihydric or higher alcohols such as glycerol, trimethylolpropane or pentaerythritol, and the aforesaid diisocyanates.

Other polyisocyanate compounds that can be used in this invention are polymethylene polyphenylene isocyanates, such as a compound of the following formula.

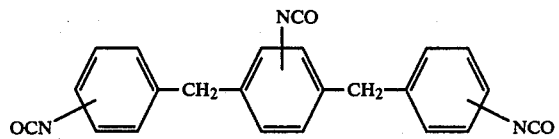

The amount of the polyisocyanate is usually such that the mole ratio of the hydroxyl groups of the unsaturated polyester to the isocyanate groups of the polyisocyanate is from 0.7 to 1.3. This mole ratio is preferably 1.0 so that all of the isocyanate groups react with the hydroxyl groups in the unsaturated polyester.

The amount of the unsaturated monomer used in this invention is generally 25 to 70% by weight, preferably 30 to 50% by weight, based on the total amount of the unsaturated polyester and the unsaturated monomer.

The composition comprising the unsaturated polyester, the unsaturated monomer and the polyisocyanate compound may, if desired, contain a polymerization inhibitor such as hydroquinone, benzoquinone, toluhydroquinone or t-butyl catechol. The composition may also contain a conventional curing catalyst such as benzoyl peroxide, methyl ethyl ketone peroxide, lauroyl peroxide, cumene hydroperoxide, dicumyl peroxide or t-butyl perbenzoate; a conventional curing promotor such as dimethylaniline and cobalt naphthenate; a conventional urethanization catalyst such as cobalt octoate or dibutyltin dilaurate; a conventional filler such as calcium carbonate, clay and aluminum hydroxide; a conventional mold releasing agent such as zinc stearate; an organic or inorganic pigment; a low shrinkage agent such as thermoplastic resins; and an alkaline earth metal oxide.

When the curing catalyst and the curing promotor are used, they are preferably selected such that the decomposition initiating temperature of the curing catalyst is at least 120° C., in view of the manufacturing process for the prepreg roving.

The filamentary reinforcing material used in this invention is in the form of roving. For example, there can be used rovings obtained by bundling glass filaments, carbon filaments, metal filaments, synthetic filaments such as polyamide filaments which have a diameter of not more than 50 microns. Glass rovings are especially preferred. The diameter of such a filamentary reinforcing material can be varied depending upon the purpose of use, but is usually 0.05 to 5 mm, preferably 0.1 to 3.0 mm.

In the production of the prepreg roving, the amount of the composition composed of the unsaturated polyester, the unsaturated monomer and the polyisocyanate compound to be impregnated in the filamentary reinforcing material is 35 to 85% of the volume of the resulting prepreg roving. The amount of the composition impregnated, however, cannot be straightforwardly determined because the density of the filamentary reinforcing material differs with its type. For example, when the reinforcing material is made of glass fibers, the amount of the composition impregnated is generally 25 to 70% by weight, preferably 30 to 60% by weight, based on the total amount of the reinforcing material and the composition. In the case of a reinforcing material composed of carbon fibers, the amount of the resin composition impregnated is generally 40 to 80% by weight based on the total amount of the reinforcing material and the composition. In the case of a reinforcing material composed of metallic fibers, the amount of the resin composition impregnated is 10 to 60% by weight based on the total amount of the reinforcing material and the composition. In the case of a reinforcing material composed of polyamide fibers, the amount of the resin composition impregnated is generally 45 to 80% by weight based on the total amount of the reinforcing material and the composition.

The invention is further described below with reference to the accompanying drawings in which.

Figure 1:
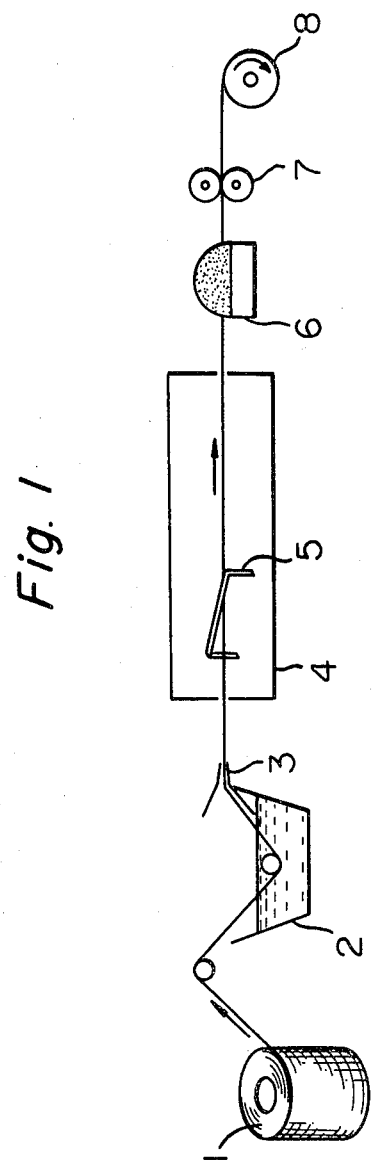
FIG. 1 is a flow chart showing the production of the prepreg of this invention.

A specific example of the production of the prepreg roving of this invention is described with reference to FIG. 1.

An unsaturated polyester resin composition composed mainly of an unsaturated polyester, an unsaturated monomer and a polyisocyanate compound is placed in a tank 2. A reinforcing material 1 such as a glass fiber roving is passed through the tank to impregnate the reinforcing material with the resin composition. Then, by means of a die 3, the impregnated reinforcing material is molded, and simultaneously, the ratio between the resin composition and the reinforcing material is controlled. The die 3 is desirably circular in cross section and has a "taper" progressively decreasing toward its tip, and a smooth-finished inside surface. As a result of the passing of the resin-impregnated reinforcing material through the die 3, the amount of the resin impregnated can be controlled, and the resin composition is fully impregnated in the reinforcing material. Simultaneously, the resin-impregnated reinforcing material can be molded into an approximately circular cross-sectional shape.

To prevent napping of the prepreg roving, the reinforcing material 1 is preferably subjected sufficiently to a binder treatment to such an extent that it does not get into trouble at the time of impregnation, and the filament of the reinforcing material 1 preferably has a uniform tension.

After passage through the die 3, the molded product is passed through a heating device set at a predetermined temperature, for example a heating oven 4, thereby bringing the resin to the B-stage and giving a prepreg roving.

The temperature inside the heating oven 4 may be controlled with regard to the decomposition temperature of a peroxide added to the unsaturated polyester resin as a curing agent. It is usually 60° to 110° C. The suitable time during which the molded product resides in the heating oven 4 is 2 to 10 minutes. When several prepreg rovings are to be produced at the same time, it is recommended to provide a separating device 5 in the heating oven 4 so as to prevent adhering of these rovings to one another.

A filler such as calcium carbonate may be added to the resin composition in order to reduce stickiness of the prepreg roving further. Preferably, the roving which has left the heating oven 4 is passed through a powder tank 6 containing a fine powder of talc, etc. to cause the powder to adhere to the roving. The prepreg roving obtained by this method is completely devoid of stickiness. When this powder adhering treatment is performed continuously, a tunnel-like space may sometimes form in the bulk of the powder in the tank 6, and the adhesion of the powder to the roving becomes insufficient. To prevent it, the powder tank 6 may be of a rotary structure or a spray structure, or a vibrator may be attached to the powder tank 6.

The resulting prepreg roving is taken up by a take-up device 7 while retaining its sectional shape, wound up on a bobbin set in a wind up device 8, and then packaged with an aluminum foil, etc.

The prepreg roving obtained by this invention has reduced stickiness, and its stickiness does not increase even on storage for a long period of time. Since the prepreg roving has good elasticity, its sectional shape does not change at the time of wind-up on a bobbin. Accordingly, at the time of after-processing, it can be unwound under a uniform tension. Furthermore, since it does not become flattened at the time of after-processing, it can be processed under a uniform tension, and thick molded articles can be obtained.

The prepreg roving having the stickiness-preventing powder adhering thereto does not adhere to itself even when it is stored in the form wound up on a bobbin.

According to the method of this invention, the hardness of the prepreg roving can be adjusted by the amount of the polyisocyanate compound. By changing the profile of the die, the cross-sectional shape of the prepreg roving or the ratio between the resin composition and the reinforcing material can be controlled as desired.

The prepreg roving of this invention is in the B-stage, and can be cured by heating it at 120° to 150° C. for 2 to 10 minutes.

The resulting prepreg roving permits easy molding of FRP articles which require complex secondary processing and are considered to be difficult to obtain by conventional methods, such as ropes, nets and the like. It is also suitable for use in forming unidirectionally reinforced FRP which is desired to be molded under tension.

Now, a method for producing a molded article using the prepreg roving as a reinforcement is described below.

A fiber-reinforced plastic can be obtained by disposing the prepreg roving between at least two B-stage sheet molding compounds (SMC) obtained by impregnating glass fibers with an unsaturated polyester resin and thickening the resin, and consolidating the assembly under heat and pressure.

The prepreg roving of this invention lends itself to easy handling because its sectional shape is nearly circular, and its surface stickiness is very much reduced. It also has good elasticity and is not affected by temperature and humidity. By using the prepreg roving in the desired thick diameter and fiber content, the fiber content and cross sectional shape of the reinforcement in the product obtained by after molding under pressure can be controlled.

When unimpregnated fibers or a prepreg roving containing a metallic thickening agent is used, the reinforcement becomes flattened, and the glass conent of the reinforcement increases. Thus, the product is liable to become cloudy. Moreover, a boundary layer is formed by the flattened reinforcement between two adjacent SMC sheets. This prevents the consolidation of the two adjoining SMC sheets (see FIG. 6), and the shearing strength among the layers of the molded article (i.e., the reinforcing effect) is reduced. In contrast, when the prepreg roving of this invention is used, the cross sectional shape of the reinforcement can be retained, and no boundary layer is formed. Thus, the adjoining SMC sheets can be consolidated (see FIG. 5), and as a result, the shearing strenth between the layers of the molded article (i.e., the reinforcing effect) is increased. Moreover, since the prepreg roving of this invention has very much reduced surface stickiness, it can be knitted into a net of the desired roving diameter and the desired mesh shape and size by using existing net knitting machines. When the net-like article is used as a reinforcement, an external force applied is borne by the individual fibers, and therefore, the reinforcing can be performed in a plurality of directions. Moreover, in the case of producing an article of a relatively complicated shape, nonuniform laying of the parallel reinforcing rovings in the molded article can be prevented at the time of molding under pressure.

Accordingly, when reinforcing is desired only in a specified direction, it is sufficient to align prepreg rovings in the reincorcing direction. When it is desired to perform reinforcing in all directions, a net-like article may be used. As required, plastic articles can be reinforced either entirely or locally by using the prepreg rovings of this invention.

In the present invention, both SMC and the prepreg rovings are in the B-stage. The two are consolidated under heat and pressure. The heating temperature is generally 110° to 160° C., preferably 130° to 150° C., and the pressure is usually 25 to 150 kg/cm$^2$, preferably 50 to 100 kg/cm$^2$.

Figure 2:
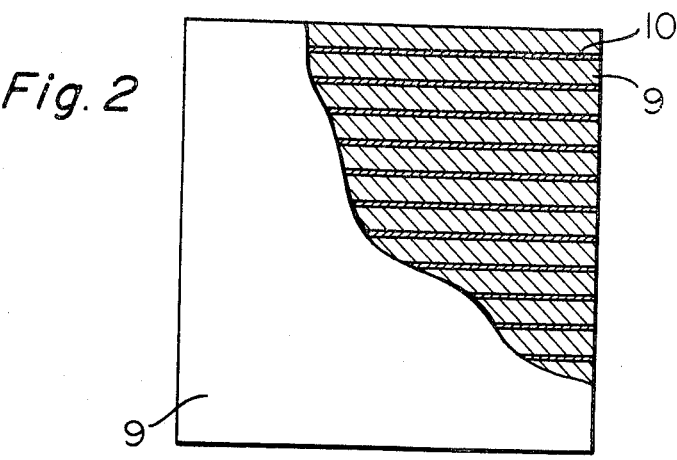
FIGS. 2 to 4 are top plan views, partly in cross section, showing embodiments of the fiber-reinforced plastic article in accordance with this invention.
Figure 3:
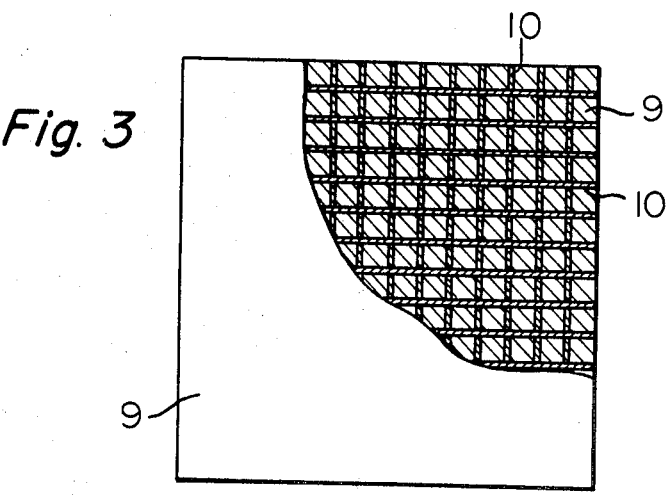
Figure 4:
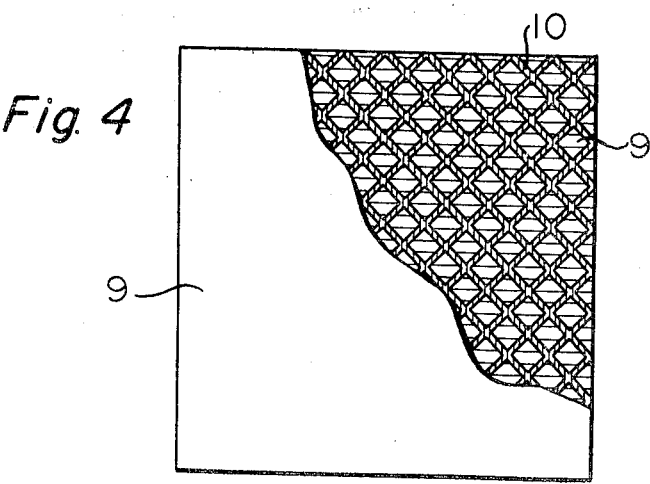
Figure 5:
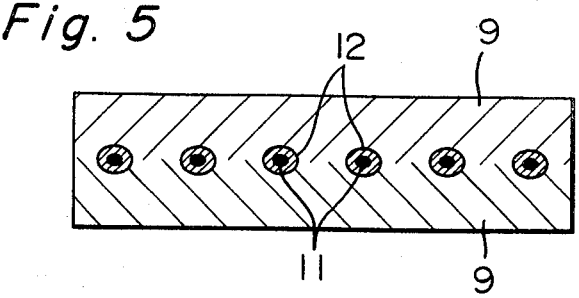
FIG. 5 is a cross-sectional view showing one example of the fiber-reinforced plastic article in accordance with this invention.
Figure 6:
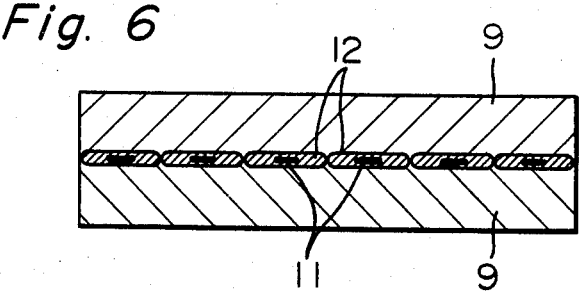
FIG. 6 is a vertical sectional view showing one example of a fiber-reinforced plastic article in accordance with a conventional method, which is presented for comparative purposes.

In consolidating the prepreg rovings and SMC, the prepreg rovings may be disposed between at least two plies of SMC in various modes, for example (1) in one direction, (2) in a lattice form, or (3) in a network form. A typical example of such molding process is shown by the drawings. FIG. 2 is a top plan view, partly cross-sectional, of a sheet-like molded article obtained by aligning prepreg roving 10 parallel to each other at suitable intervals between two SMC plies 9. FIG. 3 is a top plan view, partly cross sectional, of a sheet-like molded article obtained by arranging prepreg rovings 10 in a lattice form at suitable intervals between two SMC plies 9. FIG. 4 is a top plan, partly cross sectional, of a sheet-like molded article obtained by disposing a knotless net made of prepreg roving 10 between two SMS plies 9. FIG. 5 is a longitudinal sectional view, with respect to the lengthwise direction of the prepreg roving, of a sheet-like molded article obtained by aligning prepreg rovings 10 composed of filaments 11 and a resin layer 12 parallel to each other at suitable intervals between two plies of SMC 9. These drawings show that the prepreg rovings substantially retain their original shapes, and the two SMC plies 9 are consolidated without separation. FIG. 6 is a longitudinal sectional view, with respect to the lengthwise direction of filaments, of a sheet-like molded article obtained by aligning products, obtained by coating filaments 11 with a resin layer 12 without impregnation, parallel to each other at suitable intervals between two plies of SMC 9 as a comparison. This drawing shows that the resin coated on the filaments becomes flattened, and the two SMC plies 9 are separated.

The unsaturated polyester resin used in this invention is composed of an unsaturated polyester and an unsaturated monomer. These unsaturated polyester and unsaturated monomer are the same as those used in the production of prepreg rovings. The proportions of the unsaturated polyester and the unsaturated monomer are also the same as in the production of prepreg rovings.

The B-stage SMC is obtained usually by, for example, adding an alkaline earth metal oxide such as MgO or CaO, a metal hydrate, or the same polyisocyanate as used in the production of prepreg rovings to the resin. Of course, other methods can be employed.

In the production of SMC, the same curing catalyst, curing promotor, filler and other additives as used in the production of prepreg rovings may be added to the unsaturated polyester resin as required.

Glass fibers used for the production of SMC are usually those of suitable length (e.g., 1-5 cm) cut from a chopped strand. A cloth woven from glass fibers can also be used.

SMC can be produced by pouring the unsaturated polyester resin having added thereto MgO, CaO or a polyisocyanate onto the aforesaid glass fibers; or by uniformly dispersing glass fibers in the unsaturated polyester resin having MgO, CaO or a polyisocyanate added thereto, and forming a sheet from the product.

The present invention can afford a variety of molded articles including panels, tanks, bath tubs, automobile wheels, automobile hoods, and trunk lids.

The following examples illustrate the present invention specifically. All parts in these examples are by weight.

EXAMPLE 1

An unsaturated polyester composition composed of 100 parts of Polylite ®OD R-485 (a trademark for an unsaturated polyester resin with a styrene content of 40% by weight, a product of Dainippon Ink, & Chemicals, Inc.), 5 parts of 4,4'-diphenylmethane diisocyanate as the polyisocyanate compound, 2 parts of t-butyl perbenzoate as a curing agent, and 40 parts of calcium carbonate was fully stirred, and placed in a tank.

A glass roving (2,400 g/km) obtained by bundling glass fibers having a diameter of 13 microns was continuously passed through the tank to impregnate the resin composition in the glass roving. It was then passed through a die having a conical inside surface and an inside diameter at the exit of 2.8 mm to squeeze excess of the resin composition and adjust the volume ratio of the resin composition to the roving to 60/40 (the weight ratio of 50/50), and to mold the roving such that its cross sectional shape became circular. The molded product was aged by being passed for 3 minutes through a heating oven heated at 90° C.

Finally, the product was passed through a powder tank containing talc to apply the powder, and then wound up on a bobbin. It was then packaged with an aluminum foil, and stored.

The resulting prepreg roving had very much reduced surface stickiness, and did not become sticky with time. It did not stick to itself even on standing for a long time after wind-up.

Since the prepreg roving had moderate hardness and elasticity, its cross-sectional shape did not become flattened at the time of wind up on a bobbin. Accordingly, it could be unwound under a uniform tension.

When a net and an FW pipe were molded from the prepreg roving, the products retained the cross-sectional shape which the prepreg roving had during the molding. Moreover, it could be smoothly processed while applying a sufficient tension.

COMPARATIVE EXAMPLE 1

An unsaturated polyester composition composed of 100 parts of Polylite ®PS-260 (a trademark for an unsaturated polyester resin containing 35% by weight of styrene, a product of Dainippon Ink & Chemicals, Inc.), 2.0 parts of magnesium oxide, 2 parts of t-butyl perbenzoate and 40 parts of calcium carbonate was fully stirred, and placed in a tank.

The same operation as in Example 1 was repeated except that the unsaturated polyester composition used in Example 1 was replaced by the unsaturated polyester resin composition described above. About 30 minutes were required for the aging treatment. A prepreg roving obtained by performing the same powder adhering treatment as in Example 1 had marked stickiness, and when it was wound up on a bobbin, it closely adhered to itself. In addition, since it lacked elasticity, it became flattened on winding up on a bobbin in spite of the fact that it was molded into a circular cross-sectional shape during manufacture. Thus, coupled with the stickiness mentioned above, this deformation caused a marked trouble to unwinding.

When the aging temperature was increased to 110° C., no effect was obtained of shortening the aging time. Furthermore, the properties of the resulting prepreg roving were much the same as those of the prepreg obtained by the aforesaid procedure.

COMPARATIVE EXAMPLE 2

The same procedure as in Example 1 was performed except that a resin composition obtained by kneading 100 parts of Polylite ®PS-202 (a trademark for an unsaturated polyester resin containing 7% by weight of diallyl phthalate; solvent methyl ethyl ketone; a product of Dainippon Ink and Chemicals, Inc) with 2 parts of t-butyl perbenzoate was used instead of the resin composition used in Example 1, and that the solvent was almost completely volatilized in the heating oven over the period of 7 minutes. The resulting prepreg roving had marked stickiness and lacked elasticity. Accordingly, at the time of winding up on a bobbin, its cross-sectional shape was flattened, and because of the tackiness, unwinding of the roving was troublesome. On standing for several days, the wound-up roving became a unitary mass, and could not be unwound.

Since the solvent must be volatilized to obtain the prepreg in this example, the inside of the oven is always full of a smell of the solvent, thus necessitating a separate device for disposing of the solvent smell.

EXAMPLE 2

An unsaturated polyester resin composition consisting of 100 parts of Polylite OD-R-485 (a trademark for an unsaturated polyester resin containing 40% by weight of styrene; a product of Dainippon Ink and Chemicals, Inc.), 5 parts of 4,4'-diphenylmethane diisocyanate, and 2 parts of t-butyl perbenzoate as a curing agent was impregnated in a glass roving having a unit weight of 4600 g/km, and the impregnated glass roving was passed through a nozzle having an inside diameter at its exit end of 3.0 mm to mold it into a nearly circular cross-sectional shape. The molded product was aged at 90° C. for 3 minutes to produce a prepreg roving having a glass content of 48% by volume (60% by weight), good elasticity, and very much reduced surface stickiness.

A roving (2.3 kg/km) having a length of 1 inch obtained by bundling glass filaments having a long diameter of 13 microns was uniformly mixed with a resin composition of the following formulation. The glass content was adjusted to 30% by weight. A sheet was produced from the blend, and aged at 40° C. for 24 hours to form SMC.

| Formulation of the resin composition | |
|---|---|
| Unsaturated polyester resin (containing 35% by weight of styrene) | 100 parts |
| Zinc stearate | 3 parts |
| t-Butyl perbenzoate | 1 part |
| Magnesium oxide | 1.5 parts |
| Calcium carbonate | 120 parts |

Six plies of the resulting SMC (28 cm × 28 cm) were stacked, and the prepreg rovings were arranged parallel to each other at intervals of 2 mm between the third and fourth plies. The assembly was charged into a mold, and consolidated for 10 minutes at 140° C. and 50 kg/cm² to form a flat plate having a size of 30×30×0.9 (cm).

The prepreg rovings had a larger length than the size of the mold, and tension was exerted on the prepregs by the pinching of the prepregs during the molding.

The strength of the molded article, and the state of its longitudinal section were determined, and are shown in Table 1.

EXAMPLE 3

Six plies of the SMC obtained in Example 2 were stacked, and the same prepreg roving as in Example 2 were aligned parallel to each other at intervals of 2 mm between the first and second plies and also between the fifth and sixth plies. The assembly was consolidated under the same conditions as in Example 1 to form a flat plate having a size of 30×30×0.9 (cm).

The strength of the molded plate and the state of its longitudinal section are shown in Table 1.

COMPARATIVE EXAMPLE 3

Six plies of the SMC obtaned in Example 2 were stacked, and charged into a mold, and consolidated for 10 minutes at 140° C. and 50 kg/cm² to form a flat plate having a size of 30×30×0.9 (cm).

The strength of the molded plate and the state of its longitudinal section are shown in Table 1.

COMPARATIVE EXAMPLE 4

Six plies of the SMC obtained in Example 2 were stacked, and glass rovings (4600 g/km) coated with the same unsaturated polyester resin as used in Example 2 without heating were aligned parallel to each other at intervals of 2 mm between the third and fourth plies. The assembly was consolidated under the same conditions as in Example 2 to form a flat plate having a size of 30×30×0.9 cm.

The strength of the resulting molded plate and the state of its longitudinal section are shown in Table 1.

TABLE 1

|  | Example 2 | Example 3 | Comparative Example 3 | Comparative Example 4 |
|---|---|---|---|---|
| Flexural strength (*1) (kg/mm$^2$) | 25.6 | 35.1 | 21.8 | 22.4 |
| Interlaminar shear strength (kg/mm$^2$) (*2) | 5.8 | 7.5 | 4.4 | 3.7 |
| State of the longitudinal section of the molded article | The glass rovings did not become flattened, and the plies of the SMC formed a unitary structure (as in FIG. 5). | | No glass roving was used. | The roving coated resin was flattened, and the third and fourth plies of SMC were separated without consolidation (as in FIG. 6). |

(*1): In accordance with JIS K-6911 (width 10 mm, span 100 mm)
(*2): Short beam method (l/d = 4).

EXAMPLE 4

A prepreg roving was produced from a glass roving (1200 g/km) in the same way as in Example 2. An FRP knotless net (a mesh 20 mm in length and 20 mm in width) was produced from the resulting prepreg roving by a knotless net forming machine.

Figure 7:
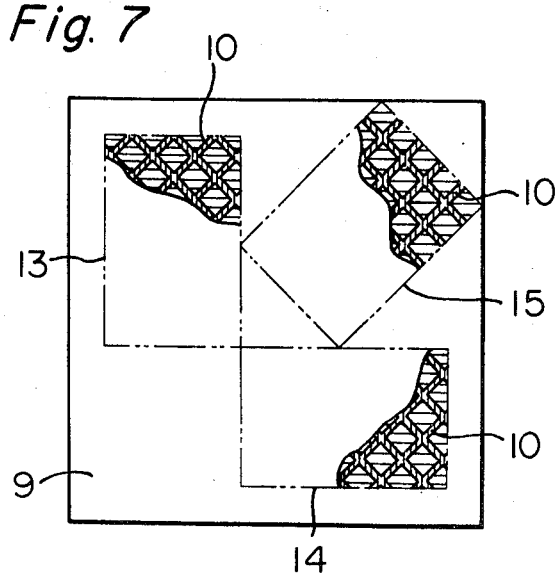
FIG. 7 is a top plan view, partly in cross section, showing the preparation of small flat plates for the test described in Example 4 given hereinbelow.

The FRP net (35 cm×35 cm) was fixed to a wooden frame (33 cm×33 cm) with all meshes being square in shape to impart a uniform tension during molding. It was held by two plies of SMC obtained in Example 2 so that the SMC 9 and the net 10 took the relative positions shown in FIG. 4. The assembly was charged into a mold, and consolidated for 10 minutes at 50 kg/cm$^2$ and 140° C. to form a flat plate 16 (FIG. 7) having a size of 30 cm×30 cm×0.3 cm. Three small plates 13, 14 and 15 having a width of 10 cm and a length of 15 cm were cut out from the resulting flat plate 16 as shown by two-dot chain lines in FIG. 7. It should be understood that as shown in the cross-sectional views in FIG. 7, the relative positions of SMC and the net differ between small plates 13, 14 and small plate 15.

Each of the small plates was subjected to a bending test under the following conditions: the distance between fulcrums 100 mm; the speed of a crosshead 5 mm/min. The results are shown in Table 2.

The flat plate obtained in Comparative Example 3 was also subjected to the same flexural bending test as in Example 4. The results are shown in Table 2.

TABLE 2

|  | Example 4 Flat plate No. | | | Comparative Example 3 |
|---|---|---|---|---|
|  | 13 | 14 | 15 | (*1) |
| Flexural strength (kg/mm$^2$) | 26.5 | 26.8 | 28.1 | 21.6 |
| Flexural modulus (kg/mm$^2$) | 1610 | 1580 | 1730 | 1150 |

(*1) The flat plate obtained in Comparative Example 3.

What we claim is:

1. A method for producing a fiber-reinforced plastic article, which comprises disposing prepreg rovings, said prepreg rovings being prepared by impregnating a composition comprising an unsaturated polyester having a hydroxyl value of at least 20, and a hydroxyl value/acid value ratio of at least 1.5, an unsaturated monomer, and a polyisocyanate compound, the amount of said polyisocyanate compound being such that the mole ratio of the hydroxyl groups of the unsaturated polyester to the isocyanate groups of the polyisocyanate compound is from 0.7 to 1.3, into a filamentary reinforcing material and heating the impregnated reinforcing material at a temperature of 60° C. to 110° C. to react the unsaturated polyester with the polyisocyanate compound, between at least two plies of sheet molding compound obtained by impregnating a composition comprising an unsaturated polyester and an unsaturated monomer in glass fibers and forming the impregnated product into a sheet; and consolidating the resulting assembly under heat and pressure.

2. The method of claim 1 wherein said prepreg rovings are aligned parallel to each other between at least two plies of said sheet molding compound.

3. The method of claim 1 wherein said prepreg rovings are arranged in a lattice form between at least two plies of said sheet molding compound.

4. The method of claim 1 wherein a net-like article made of the prepreg rovings is disposed between at least two plies of said sheet molding compound.

5. A continuous method for producing a prepreg roving having reduced tack, which comprises impregnating into a filamentary reinforcing material a composition comprising (1) unsaturated polyester having a hydroxyl value of at least 20, and a hydroxyl value/acid value ratio of at least 1.5, (2) an unsaturated monomer and (3) a polyisocyanate compound, the amount of said polyisocyanate compound being such that the mole ratio of the hydroxyl groups of the unsaturated polyester to the isocyanate groups of the polyisocyanate compound is from 0.7 to 1.3, and then heating the impregnated reinforcing material at a temperature of 60° C. to 110° C. to react the unsaturated polyester with the polyisocyanate compound.

6. The method of claim 5 wherein said polyisocyanate compound is a diisocyanate compound of the general formula $$OCN-R-NCO$$

wherein R represents an aliphatic, aromatic or alicyclic divalent group having not more than 20 carbon atoms.

7. The method of claim 5 wherein said filamentary reinforcing material is a roving of filaments selected from the group consisting of glass filaments, carbon filaments, metallic filaments and polyamide filaments.

8. The method of claim 5 wherein the amount of said unsaturated polyester resin composition impregnated in said filamentary reinforcing material is 35 to 85% by volume of the resulting prepreg roving.

9. A method according to claim 5, which comprises impregnating a filamentary reinforcing material with a composition comprising an unsaturated polyester, an unsaturated monomer and a polyisocyanate compound placed in a tank, then molding the impregnated reinforcing material and simultaneously adjusting the amount of the composition impregnated to a fixed value, and then passing the product through a heating oven thereby to bring the resin to a B-stage.

* * * * *